US009878696B2

(12) United States Patent
Baehrle-Miller et al.

(10) Patent No.: US 9,878,696 B2
(45) Date of Patent: Jan. 30, 2018

(54) METHOD FOR ACTUATING A PARKING BRAKE IN A VEHICLE

(71) Applicant: Robert Bosch GmbH, Stuttgart (DE)

(72) Inventors: Frank Baehrle-Miller, Schoenaich (DE); Lars Roters, Bietigheim-Bissingen (DE); Tobias Putzer, Bad Friedrichshall (DE); Matthieu Weinum, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/157,505

(22) Filed: May 18, 2016

(65) Prior Publication Data

US 2016/0341270 A1 Nov. 24, 2016

(30) Foreign Application Priority Data

May 18, 2015 (DE) .................. 10 2015 209 021

(51) Int. Cl.
| B60T 13/58 | (2006.01) |
| B60T 13/66 | (2006.01) |
| H02P 23/14 | (2006.01) |
| B60T 13/74 | (2006.01) |
| F16D 55/226 | (2006.01) |
| F16D 65/18 | (2006.01) |
| F16D 121/24 | (2012.01) |
| H02P 7/02 | (2016.01) |

(52) U.S. Cl.
CPC .......... B60T 13/588 (2013.01); B60T 13/662 (2013.01); B60T 13/741 (2013.01); F16D 55/226 (2013.01); F16D 65/183 (2013.01); H02P 23/14 (2013.01); F16D 2121/24 (2013.01); H02P 7/02 (2016.02)

(58) Field of Classification Search
CPC ........ B60T 13/66; B60T 13/662; B60T 13/74; B60T 13/741; B60T 13/746; B60T 13/588
See application file for complete search history.

(56) References Cited

U.S. PATENT DOCUMENTS

| 7,227,324 B2 * | 6/2007 | Erben ..................... B60T 7/045 |
| | | 318/362 |
| 2005/0046271 A1 * | 3/2005 | Suzuki .................. B60T 13/741 |
| | | 303/20 |
| 2013/0211684 A1 * | 8/2013 | Baehrle-Miller ....... B60T 7/107 |
| | | 701/70 |
| 2015/0222210 A1 * | 8/2015 | Kleinau .................... H02P 7/00 |
| | | 318/400.15 |
| 2016/0356330 A1 * | 12/2016 | Baehrle-Miller ....... B60T 7/107 |

FOREIGN PATENT DOCUMENTS

| DE | 103 61 042 B3 | 5/2005 |
| DE | 10 2011 078 900 A1 | 1/2013 |

* cited by examiner

*Primary Examiner* — Thomas J Williams
(74) *Attorney, Agent, or Firm* — Maginot, Moore & Beck LLP

(57) ABSTRACT

In a method for actuating a parking brake in a vehicle, a clamping force is generated by an electromechanical braking device comprising a brake motor. The motor voltage of the brake motor is determined on the basis of the control-unit input voltage of a closed-loop or open-loop control unit.

9 Claims, 1 Drawing Sheet

METHOD FOR ACTUATING A PARKING BRAKE IN A VEHICLE

This application claims priority under 35 U.S.C. §119 to application no. DE 10 2015 209 021.3, filed on May 18, 2015 in Germany, the disclosure of which is incorporated herein by reference in its entirety.

BACKGROUND

In DE 103 61 042 B3, a parking brake in a vehicle is described, which parking brake is used for generating a clamping force that fixes the vehicle at a standstill. The parking brake comprises an electric brake motor, which axially displaces a brake piston, which is the carrier of a brake pad, in the direction of a brake disk.

An electromechanical parking brake comprising an electric brake motor is also known from DE 10 2011 078 900 A1. The presently acting clamping force in the parking brake is determined on the basis of measured variables. As the measured variables, the motor current and the motor voltage of the electric brake motor are determined, for example, in electric circuits of a control unit that controls the electric brake motor.

SUMMARY

The method according to the invention relates to an electromechanical parking brake in a vehicle, comprising an electric brake motor, by means of which a clamping force that fixes the vehicle at a standstill can be generated. The rotary movement of the rotor of the electric brake motor is transferred into an axial actuating movement of a spindle, by means of which a brake piston, which is the carrier of a brake pad, is pressed axially against a brake disk.

Optionally, the parking brake is provided with an auxiliary braking device in order to also enable an auxiliary clamping force to be provided, if necessary, in addition to the electromechanical clamping force. The auxiliary braking device is the hydraulic vehicle brake, in particular, of the vehicle, the hydraulic pressure of which acts on the brake piston.

Assigned to the brake motor is a closed-loop or open-loop control unit, in which the motor voltage for the brake motor is generated. In the method according to the invention, the level of the motor voltage depends on the control-unit input voltage, which is present at the closed-loop or open-loop control unit on the input side. It is therefore possible to infer the motor voltage in the electric brake motor on the basis of the control-unit input voltage without the need to measure the motor voltage, for example, with the aid of electric circuits in the closed-loop or open-loop control unit. Therefore, in principle, such electric circuits or any other type of sensor system for determining the motor voltage can be omitted in the closed-loop or open-loop control unit. The level of the control-unit input voltage is known, however; it is measured in the closed-loop or open-loop control unit preferably independently of the function of the parking brake, in particular in electric circuits in the closed-loop or open-loop control unit. The number of electric circuits is reduced as a result.

The motor voltage, which is present at the closed-loop or open-loop control unit on the output side, is a defined proportion of the control-unit input voltage, which is present at the input side of the closed-loop or open-loop control unit. In particular, the difference from the control-unit input voltage is approximately or largely approximately constant, wherein the motor voltage is lower than the control-unit input voltage. The motor voltage and the control-unit input voltage therefore have an at least approximately parallel progression. Therefore, if the electrical resistance of the closed-loop or open-loop control unit and the measured control-unit input voltage are known, the motor voltage can be directly determined.

According to an advantageous embodiment, the motor current in the electric brake motor and the motor speed are determined in addition. This can be carried out without a sensor system or electric circuits in the closed-loop or open-loop control unit, just as in the case of the motor voltage. Advantageously, the mechanical and/or the electrical motor equation of the brake motor are used for this purpose, which, in the form of differential equations, indicate a relationship between motor voltage, motor current, motor speed, and motor load moment.

According to another advantageous embodiment, the distance between the brake pad and the brake disk in the parking brake is determined on the basis of the motor speed. The distance can be used for calculating the present clamping force by way of multiplying the difference of the distance between the brake pad and the brake disk by a stiffness between the brake pad and the brake disk. The clamping force correlates with the motor load moment in the brake motor; in particular, there is a proportional relationship, and so, overall, a sufficient number of formula relationships are available for determining motor voltage, motor current, motor speed, motor load moment, clamping force, and the distance between the brake pad and the brake disk.

The determination of motor voltage and motor current and, associated therewith, the motor speed and the motor load moment or the clamping force is carried out, in particular, exclusively on the basis of the measured control-unit input voltage and without measuring motor current and motor voltage in the closed-loop or open-loop control unit. It can also be advantageous, however, in particular for validating and improving the accuracy of the determination of motor current and motor voltage as well as the further state variables, to measure either the motor current or the motor voltage or even the motor current as well as the motor voltage in the closed-loop or open-loop control unit via corresponding electric circuits.

According to another advantageous embodiment, the relationships can be stored in the closed-loop or open-loop control unit as a family of characteristics as a function of different control-unit voltages. It is also possible, however, to calculate the sought variables online on the basis of formula relationships in the closed-loop or open-loop control unit.

The method according to the invention preferably runs in the closed-loop or open-loop control unit, which is a component of the parking brake.

BRIEF DESCRIPTION OF THE DRAWINGS

Exemplary embodiments of the disclosure are presented in the drawings an are explained in more detail in the description below.

In the drawings.

DETAILED DESCRIPTION

Figure 1:
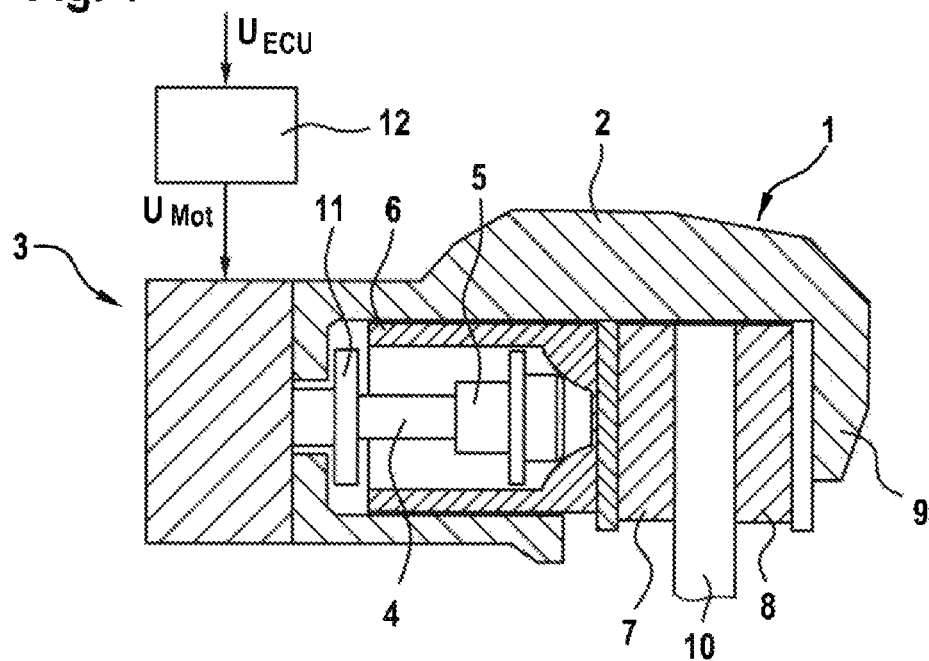
FIG. 1 shows a section through an electromechanical parking brake for a vehicle, in which the clamping force is generated via an electric brake motor.

FIG. 1 shows an electromechanical parking brake 1 for fixing a vehicle at a standstill. The parking brake 1 comprises a brake caliper 2 having a gripping device 9, which overlaps a brake disk 10. The fixed brake 1 comprises, as the actuator, an electric motor as the brake motor 3, which drives a spindle 4 in a rotating manner, on which spindle a spindle nut 5 is non-rotatably mounted in a brake piston 6. During a rotation of the spindle 4, the spindle nut 5 and the brake piston 6 are axially displaced. The spindle nut 5 is located within the brake piston 6, which is the carrier of a brake pad 7, which brake pad is pressed against the brake disk 10 by the brake piston 6. Another brake pad 8, which is fixedly held on the gripping device 9, is located on the opposite side of the brake disk 10.

Within the brake piston 6, during a rotary motion of the spindle 4 axially forward, the spindle nut 5 can move in the direction toward the brake disk 10 and, during an opposing rotary motion of the spindle 4 axially backward, said spindle nut can move until it reaches a stop 11. In order to generate a clamping force, the spindle nut 5 acts upon the inner end face of the brake piston 6, whereby the brake piston 6—which is mounted in the parking brake 1 so as to be axially displaceable—having the brake pad 7 is pressed against the facing end face of the brake disk 10.

The brake motor 3 is controlled by a closed-loop or open-loop control unit 12, which is part of the parking brake system comprising the parking brake 1. A control-unit input voltage $U_{ECU}$ is present at the closed-loop or open-loop control unit 12; the closed-loop or open-loop control unit 12 delivers, as the output, a motor voltage $U_{Mot}$, which is applied to the electric brake motor 3. The control-unit input voltage $U_{ECU}$ can be determined directly in the closed-loop or open-loop control unit 12, for example, in electronic circuits in the closed-loop or open-loop control unit 12.

The parking brake can be supported by a hydraulic vehicle brake, if necessary, and so the clamping force is composed of an electric-motor portion and a hydraulic portion. In the case of the hydraulic support, the back side of the brake piston 6 facing the brake motor is acted upon with pressurized hydraulic fluid.

Figure 2:
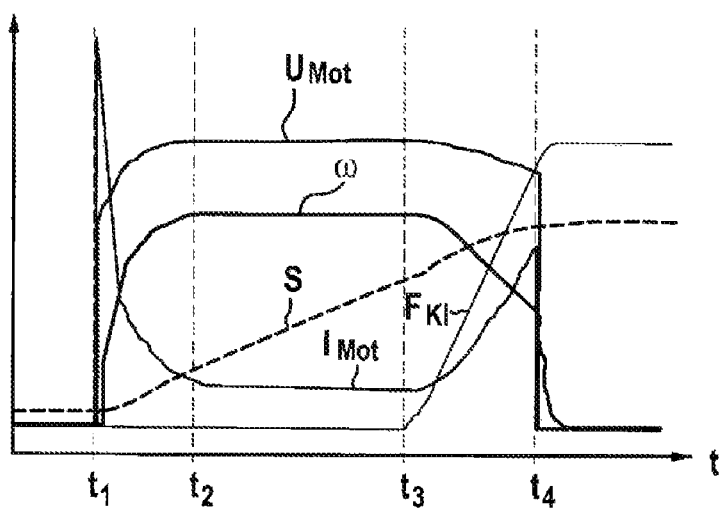
FIG. 2 shows a graph of the time-dependent progression of the motor current, the motor voltage, the motor speed, and the clamping force during the engagement process of the parking brake.

FIG. 2 shows a graph of the current progression $I_{Mot}$, the voltage $U_{Mot}$, and the progression of the motor speed ω of the electric brake motor as a function of time for an engagement process. FIG. 2 also shows a graph of the electromechanical clamping force $F_{Kl}$, which is generated by the electric brake motor, and the displacement s of the brake motor, or an actuator acted upon by the brake motor, during the engagement process.

The engagement process starts at the time t1 by way of an electrical voltage being applied and the brake motor being energized when the circuit is closed. The start phase (phase I) lasts from the time t1 to the time t2. At the time t2, the voltage $U_{Mot}$ and the engine speed ω have reached their maximum. The phase between t2 and t3 is the no-load phase (phase II), in which the current $I_{Mot}$ moves at a minimum level.

This is followed, at the time t3, by the force build-up phase (phase III) up to the time t4, in which the brake pads rest against the brake disk and are pressed against the brake disk with an increasing clamping force $F_{Kl}$. At the time t4, the electric brake motor is switched off by opening the electric circuit, and so, as the progression continues, the speed ω of the brake motor drops to zero.

The force-increase point coincides with the phase of the force build-up at the time t3. The force build-up or the progression of the clamping force $F_{Kl}$ can be determined, for example, on the basis of the progression of the current $I_{Mot}$ of the brake motor, which has the same progression, in principle, as the electromechanical clamping force $F_{Kl}$. Proceeding from the low level during the empty phase between t2 and t3, the current progression $I_{Mot}$ increases steeply at the beginning of the time t3. Provided that corresponding circuits are provided in a closed-loop or open-loop control unit of the brake motor, this increase in the current $I_{Mot}$ can be detected and used for determining the force-increase point. In principle, the progression of the force build-up can also be determined from the progression of the voltage or the speed, or from any combination of the signals for the current, voltage, and speed.

Measuring devices, in particular, circuits for measuring the motor current $I_{Mot}$ and the motor voltage $U_{Mot}$, are not absolutely necessary in the closed-loop or open-loop control unit. The motor voltage $U_{Mot}$ can be approximately calculated on the basis of the relationship $$U_{ECU} - U_{Mot} \approx \text{const.}$$

as a function of the motor input voltage $U_{ECU}$. In this case, the motor voltage $U_{Mot}$ of the brake motor progresses at least approximately parallel to and below the control-unit input voltage $U_{ECU}$. The at least approximately constant difference between the control-unit input voltage $U_{ECU}$ and the motor voltage $U_{Mot}$ is known.

The behavior of the electric brake motor, which is a direct-current motor, can be calculated using the electrical and mechanical differential equations according to $$-L \cdot \frac{dI_{Mot}}{dt} = R \cdot I_{mot}(t) + k \cdot \omega(t) - U_{Mot}(t)$$

$$J \cdot \frac{d\omega(t)}{dt} = k \cdot I_{Mot}(t) - M_{Mot}(t)$$

Therein, the following represent:
ω motor speed
L coil inductance
R ohmic resistance
k motor constant
J moment of inertia of the motor
$M_{Mot}$ motor load moment The distance between the brake pad and the brake disk must be adjusted in order to ensure the functionally-appropriate use of the electromechanical parking brake. This distance $x_B$ is proportional to the integral of the motor speed co according to $$x_B(t) \propto \int \omega(t) dt$$

The contact pressure or clamping force $F_{Kl}$ between brake pad and brake disk must be adjusted during the engagement process of the parking brake. The clamping force $F_{Kl}$ can be determined from the relationship $$F_{Kl} = c \cdot |x_B - x_S|$$

Therein, c represents the stiffness between the brake pad and the brake disk, $x_B$ represents the distance between the brake pad and the brake disk, and $x_S$ represents the brake disk position. A relationship also exists between the clamping force $F_{Kl}$ and the motor load moment $M_{Mot}$; in particular, the motor load moment $M_{Mot}$ is proportional to the clamping force $F_{Kl}$.

The aforementioned relationships make it possible to infer the motor voltage $U_{Mot}$, the motor current $I_{Mot}$, the motor load moment $M_{Mot}$, the clamping force $F_{Kl}$, the motor speed co, and the distance $x_B$ between the brake pad and the brake disk based simply on the knowledge of the control-unit input voltage $U_{ECU}$, which is measured in the regulating and control unit. The relationships can be stored in a control software in the closed-loop or open-loop control unit as a family of characteristics as a function of different control-unit voltages $U_{ECU}$.

What is claimed is:

1. A method for actuating a parking brake in a vehicle, the method comprising:
generating a clamping force of the parking brake at least partially using an electromechanical braking device that includes an electric brake motor configured to press a brake piston of the parking brake against a brake disk of the parking brake;
generating a motor voltage of the electric brake motor using a control unit wherein the motor voltage of the electric brake motor progresses at least approximately parallel to a control-unit input voltage, the control unit being at least one of (i) a closed-loop control unit and (ii) an open-loop control unit; and
determining the motor voltage based on the control-unit input voltage.

2. The method according to claim 1, further comprising:
determining at least one of a motor current and a motor speed of the electric brake motor using at least one of a mechanical motor equation and an electrical motor equation for the electric brake motor.

3. The method according to claim 1, wherein the motor voltage is determined exclusively on the basis of the input voltage of the control unit.

4. The method according to claim 1, further comprising:
determining the motor voltage using electronic circuits of the control unit.

5. The method according to claim 1, further comprising:
determining a distance between the brake pad and the brake disk based on a motor speed of the electric brake motor.

6. The method according to claim 5, further comprising:
calculating a clamping force based on the distance between the brake pad and the brake disk and a stiffness between the brake pad and the brake disk.

7. The method according to claim 1, further comprising:
storing a relationship between the input voltage of the control unit and state variables of the electric brake motor as a family of characteristics.

8. A control unit comprising:
an input configured to receive an input voltage; and
a processor connected to the input and configured to:
operate an electromechanical braking device of a parking brake to generate a clamping force of the parking brake, the electromechanical braking device including an electric brake motor configured to press a brake piston of the parking brake against a brake disk of the parking brake;
generate a motor voltage of the electric brake motor;
determine the motor voltage based on the input voltage; and
determine at least one of a motor current and a motor speed of the electric brake motor using at least one of a mechanical motor equation and an electrical motor equation for the electric brake motor,
wherein the control unit is at least one of (i) a closed-loop control unit and (ii) an open-loop control unit.

9. A parking brake in a vehicle, the parking brake comprising:
a brake piston;
a brake disk;
an electromechanical braking device having an electric brake motor configured to press the brake piston against the brake disk; and
a control unit for controlling the adjustable components of the parking brake, the control unit being at least one of (i) a closed-loop control unit and (ii) an open-loop control unit, the control unit being configured to:
operate the electromechanical braking device to generate a clamping force of the parking brake;
generate a motor voltage of the electric brake motor;
determine the motor voltage based on an input voltage of the control unit; and
determine a distance between the brake pad and the brake disk based on a motor speed of the electric brake motor.

* * * * *